United States Patent Office 3,470,096
Patented Sept. 30, 1969

3,470,096
SYNERGISTIC MIXTURES FOR CONTROL OF SLIME-FORMING BACTERIA AND OTHER DELETERIOUS MICRO-ORGANISMS AND PROCESSES USING SAME
Carl O. Tant, Houston, Nan E. Turner, Dallas, and Edward O. Bennett, Houston, Tex., assignors to Nalco Chemical Company, Chicago, Ill., a corporation of Delaware
No Drawing. Continuation-in-part of application Ser. No. 406,598, Oct. 26, 1964. This application Aug. 24, 1965, Ser. No. 482,294
Int. Cl. E21b 41/00; A01n 9/22
U.S. Cl. 252—8.55                                17 Claims

ABSTRACT OF THE DISCLOSURE

Synergistic, microbiocide mixtures comprising paired or multiple combinations of at least one of each of (a) compounds having furan, dihydrofuran or tetrahydrofuran nuclei and (b) compounds having phenol nuclei or chloroanilines at weight ratio of (a):(b) of 25:1 to 1:10 and uses thereof destroying slime-forming micro-organisms in subterranean, aqueous environment, e.g., in subterranean water-flooding operations.

---

This application is a continuation-in-part of our pending application Ser. No. 406,598, filed Oct. 26, 1964 now abandoned.

This invention relates to microbiocide compositions having a synergistic biocide effect on micro-organisms such as slime-forming bacteria and other micro-organisms considered to be deleterious or troublesome in water and especially in water flooding operations, such as are used in the secondary recovery of petroleum oil in subterranean formations, to improved water flooding fluids containing said synergistic mixtures, and to uses of said fluids in water flooding of subterranean formations.

Briefly, the synergistic compositions comprise paired or multiple combinations of at least one of each of (a) compounds having furan, dihydrofuran or tetrahydrofuran nuclei and (b) compounds having phenol nuclei or chloroanilines. These synergistic mixtures constitute improvements of the discoveries in our application Ser. No. 406,598, filed Oct. 26, 1964, which pertains to control of sulfate-reducing bacteria and other micro-organisms in water flooding operations by compounds having furan, dihydrofuran or tetrahydrofuran nuclei.

One of the most difficult problems encountered in the use of present antimicrobial agents in the treatment of the various types of flooding waters is that the agents now available tend to be relatively specific as to the various species of micro-organisms upon which they operate. Thus, while a microbiocide might be extremely effective in controlling fungi such as *Aspergillus niger*, it would not necessarily be effective in controlling anaerobic or aerobic species of bacteria.

Among the most difficult species of bacteria to control are the well known slime-forming bacteria, especially when their environment is composed of water containing relatively large amounts of dissolved inorganic salts. Under these environmental conditions, very few microbiocides will show any inhibition of slime-forming bacteria or other micro-organisms regardless of the dosage at which they are employed. Also, the few compounds found to be effective often require relatively large dosages in order to give satisfactory results, thereby increasing the cost of treating large quantities of water. It is known that most of the microbiocides are toxic to humans and animals in high concentrations, and for this reason it is considered important to avoid the use of highly toxic compounds in any concentration and to use the less toxic compound in as low concentrations as possible. See, for example, the discussion by R. C. Allred, "The Role of Microorganisms," Producers Monthly, vol. 18, No. 4, p. 18.

The most difficult problem associated with slime-forming bacteria is in high brines which are frequently encountered in the process known as water flooding.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well, and the water is pumped to a storage reservoir from which it can again be pumped into the injection well. Supplementary water from other sources may also be used in conjunction with the produced water. When the storage reservoir is open to the atmosphere and the oil is subject to aeration, this type of water flooding system is referred to herein as an "open water flooding system." If the water is recirculated in closed system without substantial aeration, the secondary recovery method is referred to herein as a "closed flooding system."

The water which is introduced into the injection wells may vary considerably in composition from one field to another. Frequently it contains relatively large quantities of dissolved salts such as sodium chloride and therefore can be described as a brine. It may also contain other salts such as those of calcium, magnesium, barium and strontium. Some iron salts may likewise be present. In some cases these salts are added to a fresh water to prevent clay minerals from swelling and sealing off porous oil sands, but in most instances their occurrence is natural.

In water flooding processes facultative aerobic bacteria grow in a manner characterized by a highly viscous mucoid outer layer or capsule surrounding each cell. These organisms are popularly referred to as "slime-forming" bacteria as a result of the common and habitual tendency of many such cells to clump together to form gelatinous, gummy masses of varying sizes. These masses cause infinite harm to water flooding processes by furnishing a protective covering to colonies of sulfate reducing bacteria, thereby providing the anaerobic organisms with more ideal growth conditions in systems containing oxygen. Also, the masses of these organisms frequently are responsible for the fouling of equipment such as pumps, filters, and pipelines used to transport the fluid in water flood systems, and may plug the subterranean formation into which such fluid is being injected to such an extent as to prevent the water flooding process from accomplishing its objectives.

It would be a valuable contribution to the art if a class of antimicrobial agents were available which were effective in the control of slime-forming bacteria particularly in processes using waters containing substantial quantities of inorganic salts and/or various organic materials which frequently interfere with present commonly used antimicrobial agents. Also beneficial would be a group of antimicrobial agents which would act to effectively control a wide variety of microorganisms, including slime-forming bacteria, at a low economical dosage.

Various substituted phenols and bisphenols have hitherto been recognized as having some bactericidal effectiveness when applied directly and individually in waterflood systems. Such applications, however, frequently have not been regular or constant in their ability to control the growth of harmful microorganisms in the aqueous media of waterflood systems because of the water insolubility of the active agents, interference of foreign solid particles, and the relative ease with which species of organisms may become resistant to the activity of such agents used alone.

By operating in accordance with the present invention, we are able to secure a product which is readily and uniformly highly dispersible and stable in aqueous media in all useful proportions, and hence has enhanced and uniform and constant antibacterial activity. Furthermore, we have discovered that by combining furan derivatives with phenol and bisphenol derivatives, their combined effectiveness is remarkably and unexpectedly greatly increased beyond that to be normally anticipated or found in mixtures of antimicrobial compounds.

It therefore becomes an object of this invention to provide a new process for controlling the growth of microorganisms with microbiocides which are effective in controlling the growth of slime-forming and other bacteria when such are found in the presence of waters containing relatively large amounts of dissolved inorganic salts and in the presence of organic matter.

Another object is to provide such control by the use of a composition having a high level of antimicrobial activity.

It is a further object of this invention is provide a composition having a high level of antibacterial activity and greatly reduced chance for the development of microbial resistance to the composition by incorporating in such composition two or more substances which have more than one mode of action on the microbial cell.

Another object of the invention is to provide mixtures exhibiting a synergistic effect in control of slime-forming bacteria.

Another object is to provide improvements in water flooding operations by the use of slime-forming bacteria and other microorganisms.

Still another object is to provide new synergistic mixtures of (a) compounds having furan, dihydrofuran or tetrahydrofuran nuclei and (b) compounds having phenol or aniline nuclei.

Other objects and advantages will appear hereinafter.

Examples of compounds of (a), supra, are as follows:

DIHYDROFURAN COMPOUND (1) 2,5-dihydrofuran

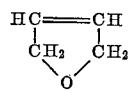

TETRAHYDROFURAN DERIVATIVES (1) 2-methyl tetrahydrofuran

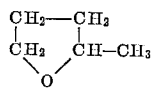

(2) 2,5-diethoxytetrahydrofuran

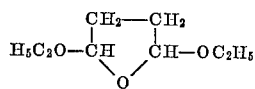

TETRAHYDROFURFURYL DERIVATIVES (1) Tetrahydrofurfuryl alcohol

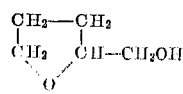

(2) Tetrahydrofurfuryl chloride

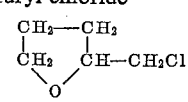

(3) Tetrahydrofurfuryl acetate

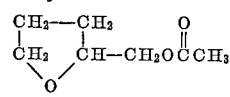

(4) Tetrahydrofurfuryl oleate

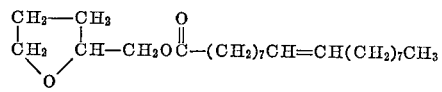

(5) Tetrahydrofurfuryl methacrylate

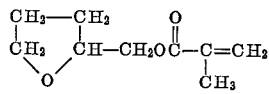

(6) Tetrahydrofurfuryl benzoate

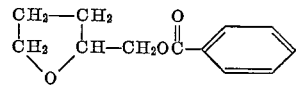

(7) Ditetrahydrofurfuryl phthalate

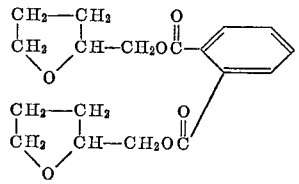

(8) 2-(2-tetrahydrofurfuryloxy)-tetrahydropyran

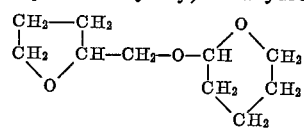

FURAN AND DERIVATIVES (1) furan

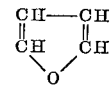

(2) 2-methyl furan

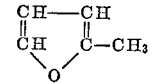

(3) 5-nitro-2-furonitrile

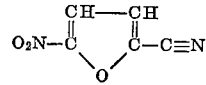

(4) 2,5-dimethyl furan

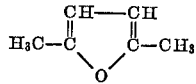

(5) propyl furoate

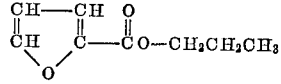

(6) amyl furoate

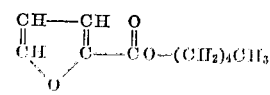

(7) phenethyl furoate
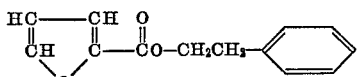

(8) 5-bromo-2-furoic acid
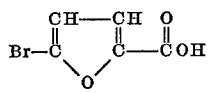

(9) furfural
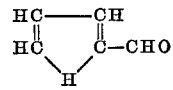

(10) ethyl 5-nitro-2-furyl ketone
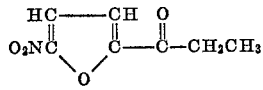

(11) N-(4-[5-nitro-2-furyl]-2-thiazolyl)-3-amino-2-oxazolidinone
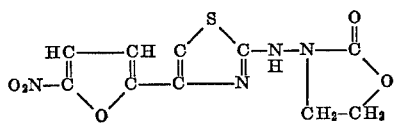

FURFURYL DERIVATIVES (1) Furfuryl alcohol
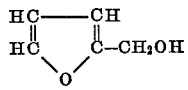

(2) 5-nitro-2-furfuryl alcohol
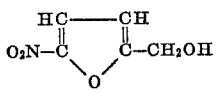

(3) 2-furanmethanethiol
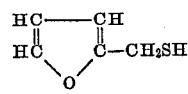

(4) furfuryl acetate
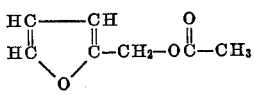

(5) methyl 5-nitro-2-furfuryl ether
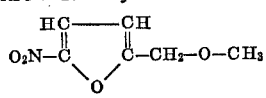

(6) methyl furfuryl ketone
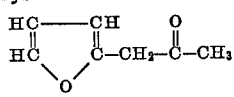

(7) N,N'-difurfuryl thiourea
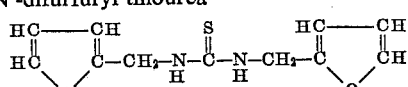

(8) 5-nitro-2-furfuryl chloroacetate
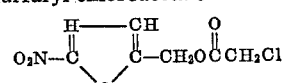

(9) 5-nitro-2-furfuryl bromoacetate
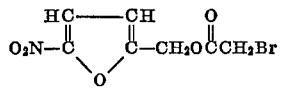

(10) 5-nitro-2-furfuryl iodide
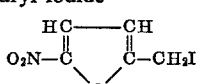

(11) 5-nitro-2-furfuryl nitrate
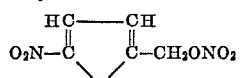

(12) trifurfuryl imidazoline
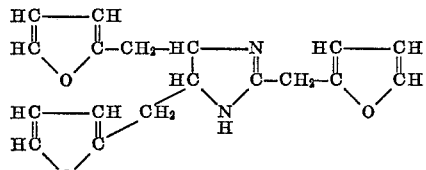

(13) 1-isopropyl-2-(2-furfuryl)-4,4-dimethyl imidazoline
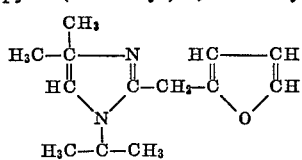

FURFURYLIDENE DERIVATIVES (1) 5-nitro-2-furfurylidene diacetate
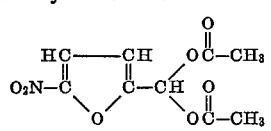

(2) 2-furfurylidene acetone
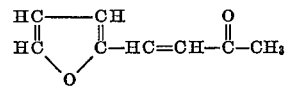

(3) 2-furfurylidene acetophenone
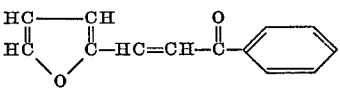

(4) 1-(5-nitro-2-furfurylideneamino) hydantoin
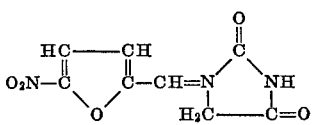

(5) 1 - (5-nitro-2-furfurylideneamino)-3-dimethylaminoethyl hydantoin
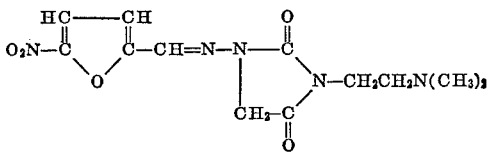

(6) N-(5-nitro-2-furfurylidene)-3-amino-2-oxazolidone
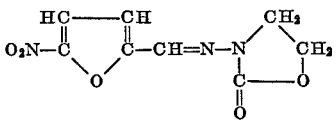

(7) 5-nitro-2-furaldehyde semicarbazone
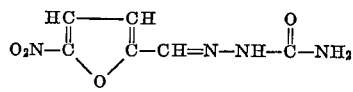

(8) 5-nitro-2-furaldehyde-2'-(2-hydroxyethyl) semicarbazone
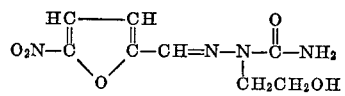

(9) 5-nitro-2-furaldehyde thiosemicarbazone
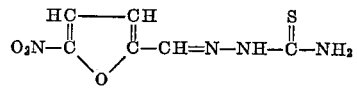

(10) 5-nitro-2-furaldoxime
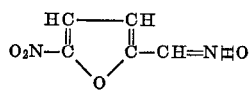

(11) beta-2-furyl acrolein
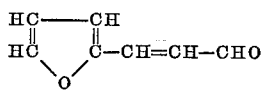

(12) alpha-methyl 2-furyl acrolein
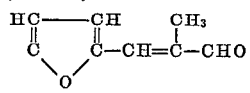

(13) ethyl 5-nitro-2-furyl acrylate
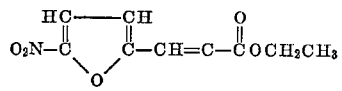

(14) furfuralazine
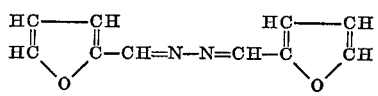

(15) N-(5-nitro-2-furfurylidene)-2-amino-2-thiono-1(N)-ethanol imidazolidine
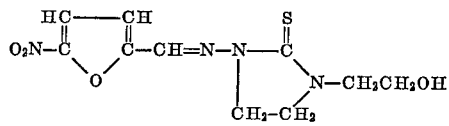

(16) N-(5-nitro-2-furfurylideneamino) chloroethyl carbamate
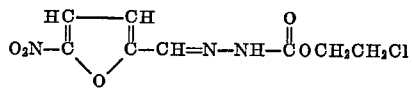

(17) N-(5-nitro-2-furfurylideneamino) ethanol carbamate
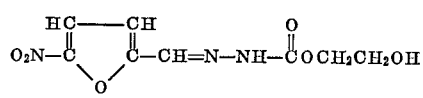

(18) N-(5-nitro-2-furfurylideneamino) guanidine hydrochloride
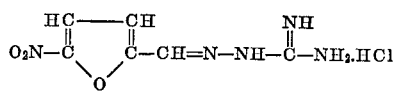

(19) N-acetyl N'-(5-nitro-2-furaldehyde) hydrazide
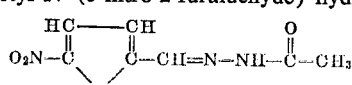

(20) N-acetyl N-carbamylmethyl N'-(5-nitro-2-furaldehyde) hydrazide
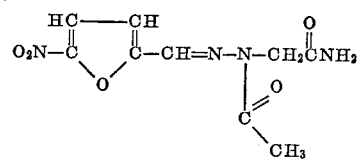

(21) N-formyl N-carbamylmethyl N'-(5-nitro-2-furaldehyde) hydrazide
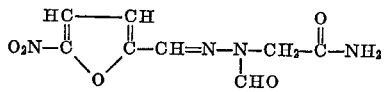

(22) N-carbomethoxy-N-carbamylmethyl N'-(5-nitro-2-furaldehyde) hydrazide
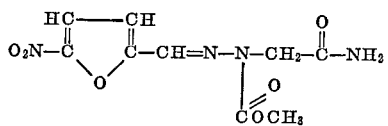

(23) N-aminoacetyl N'-(5-nitro-2-furaldehyde) hydrazide hydrochloride
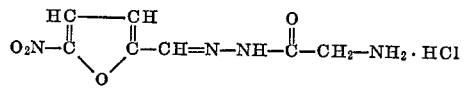

RELATED COMPOUNDS (1) Dibenzofuran
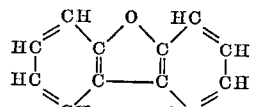

(2) 3-nitrodibenzofuran
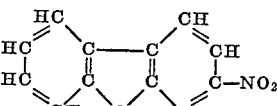

(3) beta-2-furylidene acetone
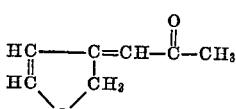

(4) 1,2-5,6-isopropylidene glucofuranose
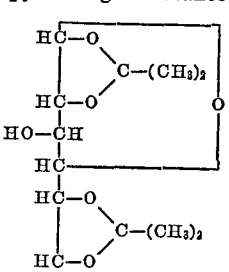

(5) NF-746
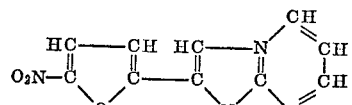

(6) NF-963
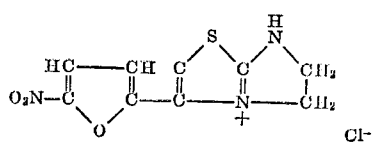

The above compounds have effective bactericidal and bacteriostatic activity on slime forming and sulfate reducing organisms, especially those organisms associated with the problems of waterflooding of subterranean formations in the production of oil and in water disposal.

These compounds are used effectively in concentrations in the water in the range of 2–200 p.p.m., although greater concentrations can be used without harm.

The bactericidal and bacteriostatic activity of these compounds is improved measurably when combined with compounds having phenol nuclei or chloroanilines, as will be shown hereinafter.

The last-mentioned compounds include chloroaniline, chloro- or alkyl-substituted mono-phenols, and bis-(chloro- or alkyl-) substituted phenols. Preferred phenol compounds include monoalkyl phenols having 2–8 carbons in the alkyl group, dialkyl phenols having 2–8 carbons in each alkyl group, monohalo- and dihalo- phenols or monohalo-, monoalkyl phenols with 2–8 carbon alkyl groups and the like, especially the chloro derivatives. The most preferred class of phenol compounds fall in the class having the general formula

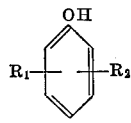

wherein $R_1$ is hydrogen, alkyl of 2–8 carbons, or chloro, and $R_2$ is alkyl of 2–8 carbons or chloro, and $R_1$ and $R_2$ respectively are either ortho or para to the phenol OH group.

The preferred bis-phenol compounds are alkylene bis-phenols in which the phenol rings may be unsubstituted or substituted in one or two positions, generally either ortho or para to the OH group, by alkyl or 2–8 carbons and/or halogen, especially chlorine. The preferred class of bis-phenols fall in the class having the general formula

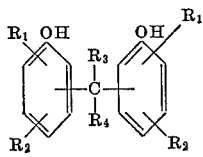

wherein $R_1$ and $R_2$ have the significance aforestated for $R_1$ and $R_2$ in monophenol compounds, $R_3$ is hydrogen or alkyl of 1–4 carbons, and $R_4$ is hydrogen or alkyl of 1–4 carbons. $R_1$ and $R_2$, respectively, generally are either ortho or para to the phenol OH group, and the bis-substituted phenol compounds preferably are symmetrical.

Synergism in various, paired combinations of (a) compounds having a furan, dihydrofuran, and tetrahydrofuran nucleus and (b) compounds in the chloroaniline, substituted mono-phenol and bis-substituted phenol class will vary with the pair selected, as will the best ratio of compounds (a) and (b) for obtaining the best synergistic action. Generally, however, the weight ratio of (a) to (b) will be in the range of about 25:1 to 1:10. Standard tests on the microorganism or microorganisms to be controlled can be used to determine the best synergistic ratio for any particular pair of (a) and (b).

The biocidal efficacy against slime-forming bacteria of the following synergistic combinations of the invention was ascertained by the determination of bactericidal activity in accord with the methods described in U.S. Patent No. 3,084,097. The test organism was No. 904 Slime Former mixture, a culture of mixed flora of facultative heterotrophic "slime-forming" bacteria (predominantly Pseudomonas species) isolated by Visco Laboratories from a waterflood system. The inhibition test is by standard tube dilution technique, using 16 x 150 mm. culture tubes with Willett caps. Test media consisted of beef extract (Difco), 1.0 gm., and Tryptone (Difco) 5 gm. per liter of deionized distilled water.

Combinations which showed synergism, and the results thereof, are as follows:

TEST SERIES I

Composition:
A. 5-nitro-2-furfural diacetate
B. di-sec-amylphenol

TABLE I

| Concentration, p.p.m. | | Percent reduction | |
|---|---|---|---|
| A | B | 10 min. exposure | 2 hr. exposure |
| 0 | 10 | 4 | 8 |
| 1 | 9 | 6 | 10 |
| 3 | 7 | 35 | 98 |
| 5 | 5 | 50 | 98 |
| 7 | 3 | 55 | 98 |
| 9 | 1 | 5 | 60 |
| 10 | 0 | 0 | 45 |

The above values evidence synergism by virtue of respective low activities at the 0:10 and 10:0 concentration ratios and high activities in the intermediate range, wherein A and B are in admixture.

TEST SERIES II

Composition:
A. 5-nitro-2-furfural diacetate, as 8% solution in a 50–50 mixture of methanol and propanol.
B. p-sec-butyl phenol, as a 30.0% solution in propanol.

TABLE II

| Concentration, p.p.m.[1] | | Percent reduction | |
|---|---|---|---|
| A | B | 10 min. exposure | 2 hr. exposure |
| 0 | 10 | 4 | 35 |
| 1 | 9 | 4 | 30 |
| 3 | 7 | 18 | 42 |
| 5 | 5 | 30 | 95 |
| 7 | 3 | 40 | 95 |
| 9 | 1 | 25 | 65 |
| 10 | 0 | 0 | 60 |

[1] Concentration of solutions.

In determining percent reduction, counts for untreated controls were made with the test organisms exposed to similar concentrations of the alcohols used as solvents in A and B. Possible cidal effects of the alcohols, therefore, need not be considered in making comparisons from the above table. In all cases, alcohol concentration in treated and untreated control tubes was less than one percent by volume of the tube volume.

The above values evidence synergism by virtue of respective low activities at the 0:10 and 10:0 concentration ratios and high activities in the intermediate range, wherein A and B are in admixture.

TEST SERIES III

Composition:
A. 2,2'-methylene-bis-(4-chlorphenol), as 5.0% solution in propanol.
B. Furfural, as 50.0% solution in propanol.

TABLE III

| Concentration, p.p.m.[1] | | Percent reduction | |
|---|---|---|---|
| A | B | 10 min. exposure | 2 hr. exposure |
| 0 | 10 | 10 | 20 |
| 1 | 9 | 25 | 30 |
| 3 | 7 | 30 | 65 |
| 5 | 5 | 38 | 62 |
| 7 | 3 | 52 | 70 |
| 9 | 1 | 22 | 75 |
| 10 | 0 | 10 | 50 |

[1] Concentration of solutions.

The remarks regarding possible cidal effect of the solvent in Test Series II apply here, also. Synergism is indicated in the results reported above.

TEST SERIES IV

Composition:
A. p-Chlorophenol, as a 10.0% solution in propanol.
B. Furfural, as 50% solution in propanol.

TABLE IV

| Concentration, p.p.m.[1] | | Percent reduction 2 hr. exposure |
|---|---|---|
| A | B | |
| 0 | 10 | 0 |
| 1 | 9 | 4 |
| 3 | 7 | 25 |
| 7 | 3 | 55 |
| 9 | 1 | 16 |
| 10 | 0 | 0 |

[1] Concentration of solutions.

The remarks regarding possible cidal effect of the solvent in Test Series II apply here, also. Synergism is indicated in the results reported above. Results at 10 minutes exposure were inconclusive.

TEST SERIES V

Composition:
A. 5-nitro-2-furfural diacetate, as 8.0% solution in 50–50 mixture of methanol and propanol.
B. p-Chlorophenol, as 10.0% solution in propanol.

TABLE V

| Concentration, p.p.m. | | Percent reduction | |
|---|---|---|---|
| A | B | 10 min. exposure | 2 hr. exposure |
| 0 | 10 | 16 | |
| 3 | 7 | 76 | |
| 5 | 5 | 88 | |
| 7 | 3 | 77 | |
| 9 | 1 | 83 | |
| 10 | 0 | 42 | |

[1] Concentration of solutions.

The remarks regarding possible cidal effect of the solvent in Test Series II apply here, also. Synergism is indicated in the results reported above. Results in 10 minutes exposure were inconclusive.

TEST SERIES VI

Composition:
A. o-Chloroaniline, as 8.0% solution in propanol.
B. Furfuryl alcohol, 30.0% solution in propanol.

TABLE VI

| Concentration, p.p.m.[1] | | Percent reduction | |
|---|---|---|---|
| A | B | 2 hr. exposure | 4 hr. exposure |
| 0 | 10 | 5 | 0 |
| 1 | 9 | 15 | 10 |
| 3 | 7 | 25 | 40 |
| 5 | 5 | 22 | 40 |
| 7 | 3 | 12 | 20 |
| 9 | 1 | 5 | 5 |
| 10 | 0 | 0 | 4 |

[1] Concentration of solutions.

The remarks regarding possible cidal effect of the solvent in Test Series II apply here, also. Synergism is indicated in the results reported above. Neither A nor B was substantially effective at a concentration of 10 p.p.m. but substantial inhibition was obtained with a combination of 5 p.p.m. of each. Results at 10 minutes exposure were inconclusive.

TEST SERIES VII

Composition:
A. o-Chloroaniline, as 8.0% solution in propanol.
B. 5-nitro-2-furfural diacetate, as 8.0% solution in a 50–50 mixture of methanol and propanol.

TABLE VII

| Concentration, p.p.m.[1] | | Percent reduction, 4 hr. exposure |
|---|---|---|
| A | B | |
| 0 | 10 | 17 |
| 1 | 9 | 16 |
| 3 | 7 | 26 |
| 5 | 5 | 45 |
| 7 | 3 | 24 |
| 9 | 1 | 22 |
| 10 | 0 | 8 |

[1] Concentration of solutions.

The remarks regarding possible cidal effect of the solvent in Test Series II apply here, also. Synergism is indicated in the results reported above, particularly at about the 5:5 ratio. Evidence of synergism was inconclusive at 10 minute and 2 hour exposure times.

As evidenced above, 5-nitro-furfural diacetate paired with the aforesaid compounds of group (b), supra, especially the dialkyl or monoalkyl phenols or chlorophenols, evidences marked synergism. Also, furfural or furfuryl alcohol paired with the chloro compounds, i.e., alkylene-bis-chlorophenols, chlorophenols and chloroaniline show synergistic characteristics.

The foregoing furan, dihydrofuran and tetrahydrofuran compounds fall in a class of compounds having the formulae $$R_1-C\underset{O}{\overset{CH-CH}{\diagup\diagdown}}C-R_2 \text{ or } R_1-CH_2\underset{O}{\overset{CH=CH}{\diagup\diagdown}}CH_2-R_2 \text{ or } R_1-CH\underset{O}{\overset{CH_2-CH_2}{\diagup\diagdown}}CH-R_2$$

The substituent groups $R_1$ and $R_2$ may be hydrogen or wide variety of organo substituents as is evidenced by the preceding examples.

Taking first the compounds of most simple molecular formula, $R_1$ may be hydrogen; alkyl of 1–4 carbons; alkoxy of 1–4 carbons; nitro; chloro; or bromo; while $R_2$ may be hydrogen; alkyl of 1–4 carbons; alkoxy of 1–4 carbons; hydroxyalkyl of 1–4 carbons; mercaptoalkyl of 1–4 carbons; chloroalkyl of 1–4 carbons; bromoalkyl of 1–4 carbons; nitro; cyano; aldehydo; carboxyl;

—$CH_2OOCR_3$ wherein $R_3$ is alkyl of 1–20 carbons, alkenyl of 2–20 carbons, phenyl, phenyl alkyl wherein the alkyl group has 1–4 carbons, chloroalkyl of 1–4 carbons, or bromoalkyl of 1–4 carbons;

—$COOR_4$ wherein $R_4$ is alkyl of 1–20 carbons, alkenyl of 2–20 carbons, or phenyl alkyl wherein the alkyl group has 1–4 carbons;

—CO—$R_5$ wherein $R_5$ is alkyl of 1–4 carbons;

—$CH_2$—O—$R_6$ wherein $R_5$ is alkyl of 1–4 carbons;

—$CH_2$—CO—$R_7$ wherein $R_7$ is alkyl of 1–4 carbons;

—$CH_2R_8$ wherein $R_8$ is halo, especially chloro, bromo or iodo, or —$ONO_2$;

$$-C\underset{R_{10}}{\overset{R_9}{\diagup}}H$$

wherein $R_9$ and $R_{10}$ are lower alkanoyl, especially —$OOCCH_3$;

—CH=$R_{11}$ wherein $R_{11}$ is:
1 - iminohydantoin, 1 - imino - 3 - dimethylaminoethyl hydantoin, =NOH, 3-imino-2-oxazolidone,
=$CHCOR_{12}$ wherein $R_{12}$ is alkyl of 1–4 carbons or phenyl, $$=N-N-\underset{R_{13}}{\overset{\overset{X}{\|}}{C}}-NH_2$$

wherein $R_{13}$ is hydrogen or hydroxyalkyl of 2–4 carbons and X is NH, O or S, $$=C-CHO \atop R_{14}$$

wherein $R_{14}$ is hydrogen or lower alkyl of 1–4 carbons,
=CH—COO—$R_{15}$ wherein $R_{15}$ is alkyl of 1–4 carbons,
=N—NHCOO$R_{16}$ wherein $R_{16}$ is hydroxyalkyl of 2–4 carbons or chloroalkyl of 2–4 carbons, or $$=N-N-R_{18} \atop R_{17}$$

wherein $R_{17}$ is hydrogen or carbamylmethyl and $R_{18}$ is actyl, —CHO, carboxymethyl or aminoacetyl.

Related, more molecularly complex compounds useful in practice of the invention include dicarboxy acid esters of 2-furfuryl alcohol, 2-tetrahydrofurfuryl alcohol, 5-nitro-2-furfuryl alcohol, and the like, such as di-tetrahydrofurfuryl phthalate, oleate, adipate, etc.; 2-(2-tetrahydrofurfuryloxy) - tetrahydropyran; N - (4 - [5 - nitro- 2 - furyl] - 2 - thiazoyl) - 3 - amino - 2 - oxazolidinone; N,N'-difurfuryl thiourea; trifurfuryl imidazoline; 1-isopropyl - 2 - (2 - furfuryl) - 4,4 - dimethyl imidazoline; furfuralazine; N - (5 - nitro - 2 - furfurylidene) - 3-amino-2-thiono-1(N)-ethanol imidazoline, dibenzofuran, nitrobenzofuran, beta-furylidene acetone, 1,2,5,6-isopropylidene glucofuranose, the aforesaid compounds designated NF–746 and NF–963, and related compounds of those aforelisted.

Those of the above compounds which bear a nitro group are to be particularly preferred in mixtures providing the synergism herein described, especially when used in combination with the aforesaid alkyl substituted phenols, the aforesaid chloro-substituted phenols, and the aforesaid bis-chlorophenols.

As aforestated, considered as a broad class, the better synergistic mixtures have a weight ratio of (a) to (b), supra, in the range of about 25:1 to 1:10. Most often, said range will be about 10:1 to 1:10 for the best synergistic mixtures.

Referring to the foregoing test series, the A:B ratios providing clear evidence of synergism are as follows:

| Test series | A:B ratios of solutions | Approx. A:B ratios of of active compounds |
|---|---|---|
| I | | 3:7–9:1 |
| II | 3:7–9:1 | 1:10–2.5:1 |
| III | 3:7–9:1 | 1:25–1:1 |
| IV | 3:7–9:1 | 1:12–1:2 |
| V | 3:7–9:1 | 1:3–7.5:1 |
| VI | 3:7–7:3 | 1:10–1:2 |
| VII | 3:7–9:1 | 3:7–9:1 |

When synergistic mixtures herein described are employed in treating flooding waters to control slime forming bacteria growth, the total conncentration of the two active microbiocides (a) and (b), supra, may be as low as about one p.p.m. (note Test Series V). In many instances, however, about two p.p.m. or more is desirable. The upper total concentration is not critical and may be as high as about 200 p.p.m.

The invention herein is particularly useful in controlling growth of or destroying slime-forming microorganisms in an aqueous environment even when such microorganisms are colonized in a slime-forming bacteria mass in a subterranean, aqueous environment.

The invention is hereby claimed as follows:

1. A microbiocide composition useful in subterranean flooding operations consisting essentially of a mixture selected from the group consisting of:
   (1) 5-nitro-2-furfural diacetate and di-sec-amlyphenol at a weight ratio of 3:1 to 9:1
   (2) 5-nitro-2-furfural diacetate and p-sec-butylphenol at a weight ratio of 1:10 to 2.5:1
   (3) furfural and 2,2'-methylene-bis-(4-chlorophenol) at a weight ratio of 25:1 to 1:1
   (4) furfural and p-chlorophenol at a weight ratio of 12:1 to 1:2
   (5) 5-nitro-2-furfural diacetate and p-chlorophenol at a weight ratio of 1:3 to 7.5:1
   (6) furfuryl alcohol and o-chloroaniline at a weight ratio of 10:1 to 2:1, and
   (7) 5-nitro-2-furfural diacetate and o-chloroaniline at a weight ratio of 7:3 to 1:9.

2. A microbiocide composition useful in subterranean water flooding operations consisting essentially of (a) 5-nitro-2-furfural diacetate and (b) di-sec-amylphenol in a synergistic weight ratio of (a) to (b) in the range of about 3:7 to 9:1.

3. A microbiocide composition useful in subterranean water flooding operations consisting essentially of (a) 5-nitro-2-furfural diacetate and (b) p-sec-butylphenol in a synergistic weight ratio of (a) to (b) in the range of about 1:10 to 2.5:1.

4. A microbiocide composition useful in subterranean water flooding operations consisting essentially of (a) 2,2'-methylene-bis-(4-chlorophenol) and (b) furfural in a synergistic weight ratio of (a) to (b) in the range of about 1:25 to 1:1.

5. A microbiocide composition useful in subterranean water flooding operations consisting essentially of (a) p-chlorophenol and (b) furfural in a synergistic weight ratio of (a) to (b) in the range of about 1:12 to 1:2.

6. A microbiocide composition useful in subterranean water flooding operations consisting essentially of (a) 5-nitro-2-furfural diacetate and (b) p-chlorophenol in a synergistic weight ratio of (a) to (b) in the range of about 1:3 to 7.5:1.

7. A microbiocide composition useful in subterranean water flooding operations consisting essentially of (a) o-chloroaniline and (b) furfuryl alcohol in a synergistic weight ratio in the range of about 1:10 to 1:2.

8. A microbiocide composition useful in subterranean water flooding operations consisting essentially of (a) o-chloroaniline and (b) 5-nitro-2-furfural diacetate in a synergistic weight ratio of (a) to (b) of about 3:7 to 9:1.

9. A process for destroying slime-forming microorganisms in an aqueous environment which comprises contacting said microorganisms in an aqeous environment with a small, biocidal amount of a microbiocide composition consisting essentially of a member from the group consisting of:
   (1) 5-nitro-2-furfural diacetate and di-sec-amylphenol at a weight ratio of 3:7 to 9:1
   (2) 5-nitro-2-furfural diacetate and p-sec-butylphenol at a weight ratio of 1:10 to 2.5:1
   (3) furfural and 2,2'-methylene-bis-(4-chlorophenol) at a weight ratio of 25:1 to 1:1
   (4) furfural and p-chlorophenol at a weight ratio of 12:1 to 1:2
   (5) 5-nitro-2-furfural diacetate and p-chlorophenol at a weight ratio of 1:3 to 7.5:1
   (6) furfuryl alcohol and o-chloroaniline at a weight ratio of 10:1 to 2:1, and
   (7) 5-nitro-2-furfural diacetate and o-chloroaniline at a weight ratio of 7:3 to 1:9.

10. A process for destroying slime-forming microorganisms colonized in a slime-forming bacteria mass in a subterranean, aqueous environment which comprises contacting said colonized mass with a small, biocidal amount of a microbiocide composition consisting essentially of a member from the group consisting of:
   (1) 5-nitro-2-furfural diacetate and di-sec-amylphenol at a weight ratio of 3:7 to 9:1
   (2) 5-nitro-2-furfural diacetate and p-sec-butylphenol at a weight ratio of 1:10 to 2.5:1
   (3) furfural and 2,2'-methylene-bis-(4-chlorophenol) at a weight ratio of 25:1 to 1:1
   (4) furfural and p-chlorophenol at a weight ratio of 12:1 to 1:2
   (5) 5-nitro-2-furfural diacetate and p-chlorophenol at weight ratio of 1:3 to 7.5:1
   (6) furfuryl alcohol and o-chloroaniline at a weight ratio of 10:1 to 2:1, and
   (7) 5-nitro-2-furfural diacetate and o-chloroaniline at a weight ratio of 7:3 to 1:9.

11. A process as claimed in claim 10 wherein said composition consists essentially of: 5-nitro-2-furfural diacetate and di-sec-amylphenol at a weight ratio of 3:7 to 9:1.

12. A process as claimed in claim 10 wherein said composition consists essentially of: 5-nitro-2-furfural diacetate and p-sec-butylphenol at a weight ratio of 1:10 to 2.5:1.

13. A process as claimed in claim 10 wherein said composition consists essentially of: furfural and 2,2'-methylene-bis-(4-chlorophenol) at a weight ratio of 25:1 to 1:1.

14. A process as claimed in claim 10 wherein said composition consists essentially of: furfural and p-chlorophenol at a weight ratio of 12:1 to 1:2.

15. A process as claimed in claim 10 wherein said composition consists essentially of: 5-nitro-2-furfural diacetate and p-chlorophenol at weight ratio of 1:3 to 7.5:1.

16. A process as claimed in claim 10 wherein said composition consists essentially of: furfuryl alcohol and o-chloroaniline at a weight ratio of 10:1 to 2:1.

17. A process as claimed in claim 10 wherein said composition consists essentially of: 5-nitro-2-furfural diacetate and o-chloroaniline at a weight ratio of 7:3 to 1:9.

References Cited
UNITED STATES PATENTS

| | | | |
|---|---|---|---|
| 1,548,077 | 8/1925 | Wallis | 167—33 |
| 1,554,642 | 9/1925 | Miner | 167—33 |
| 1,738,740 | 12/1929 | Trickey et al. | 167—33 |
| 2,319,481 | 5/1943 | Stillman et al. | 167—33 |
| 2,882,227 | 4/1959 | Lindberg | 252—8.55 |
| 3,033,784 | 5/1962 | Jones | 252—8.55 X |
| 3,054,749 | 9/1962 | Bennett et al. | 252—8.55 |
| 3,199,591 | 8/1965 | Kepley | 252—8.55 |
| 3,271,307 | 9/1966 | Dickson et al. | 252—8.55 |
| 2,502,114 | 3/1950 | Witte et al. | 260—347.8 X |

HERBERT B. GUYNN, Primary Examiner

U.S. Cl. X.R.

424—270, 272, 273, 278, 285